United States Patent [19]

Riedinger

[11] 4,414,794
[45] Nov. 15, 1983

[54] HINGE ARRANGEMENT FOR AN ARTICULATED COMBINE

[75] Inventor: Franz W. Riedinger, Horizontina, Brazil

[73] Assignee: Deere & Company, Moline, Ill.

[21] Appl. No.: 371,045

[22] Filed: Apr. 23, 1982

[51] Int. Cl.³ .............................................. B60D 1/00
[52] U.S. Cl. ..................................... 56/16.6; 56/13.3; 280/400; 280/492
[58] Field of Search ....................... 56/14.6, 344, 16.6, 56/13.3; 130/27 T, 27 R; 172/292, 791, 793, 799; 280/400, 492

[56] References Cited

U.S. PATENT DOCUMENTS

| | | | |
|---|---|---|---|
| 2,212,465 | 8/1940 | Baldwin | 56/14.6 |
| 2,223,375 | 12/1940 | Tourneau | 280/33.44 |
| 2,268,090 | 8/1966 | Wirkkala | 212/7 |
| 3,240,284 | 3/1966 | Finneman | 180/51 |
| 3,484,964 | 12/1969 | Jeffery, Jr. | 327/117.5 |
| 3,828,535 | 8/1974 | Lundahl | 56/344 |
| 3,907,139 | 9/1975 | Luscombe | 56/344 |
| 3,995,569 | 12/1976 | Picardat | 111/6 |
| 4,140,186 | 2/1979 | Stedman | 280/400 |
| 4,279,312 | 7/1981 | Pyle | 172/292 |
| 4,290,622 | 9/1981 | Horvath | 280/400 |
| 4,317,326 | 3/1982 | Riedinger | 56/14.6 |

Primary Examiner—Robert P. Swiatek
Assistant Examiner—Kris R. Schulze

[57] ABSTRACT

In an articulated combine, the hinge arrangement connecting the front and rear bogies consists of spaced-apart upper and lower links. The lower link construction provides for oscillation between the bogies as well as establishing a steering pivot center. The upper link normally lies in a fore-and-aft plane and is pivotally connected between rearward upper portions of the respective bogies, thus spanning the length of the rear bogie. The hinge arrangement also provides part of the structure for a conveyor for conveying clean grain between the front and rear bogies. In one embodiment, the upper link comprises an auger tube into which clean grain is introduced by a clean grain elevator and cross auger. In another embodiment, the lower link assembly does double duty as an auger conveyor housing.

13 Claims, 7 Drawing Figures

HINGE ARRANGEMENT FOR AN ARTICULATED COMBINE

CROSS REFERENCE TO RELATED APPLICATIONS

U.S. patent application Ser. No. 371,047 filed Apr. 23, 1982 simultaneously herewith in the names of Allen et al, entitled GRAIN HANDLING ARRANGEMENT FOR AN ARTICULATED COMBINE and assigned to the assignee of the invention herein, is directed in a preferred embodiment to an articulated combine in which a portion of the hinge arrangement connecting the two bogies does double duty as a structural component of the hinge and as a conveyor for transferring cleaned grain from the front bogie to a grain tank in the rear bogie. To the extent that the invention disclosed and claimed in Application Docket No. 11,612 is disclosed herein, it is done so only for completeness of description of the operative environment of the invention claimed herein and thus forms no part of the invention claimed herein.

U.S. patent application Ser. No. 371,046 filed Apr. 23, 1982 simultaneously herewith in the names of Hagstrom et al, entitled COMBINE HARVESTER WITH HEADER MOUNTED SEPARATOR and assigned to the assignee of the invention herein, as directed in a preferred embodiment to a combine harvester in which the header includes an axial flow rotary separator including threshing and separating portions mounted immediately rearward of the header gatherer portion, and in which separated grain and chaff is delivered by way of a feederhouse to a cleaning shoe carried in the body of the combine. In one embodiment, the combine body is articulated and the cleaning shoe is carried in the forward bogie. To the extent that the invention disclosed and claimed in application Ser. No. 371,046 filed Apr. 23, 1982 is disclosed herein, it is done so only for completeness of description of the operative environment of the invention claimed herein and thus forms no part of the invention claimed herein.

BACKGROUND OF THE INVENTION

This invention concerns articulated harvesters and, more particularly, a hinge arrangement for connecting front and rear bogies of such harvesters so as to provide for steering and for oscillation when traversing uneven ground.

An articulated harvester, compared with a conventional rigid chassis machine of similar size and capacity, has recognized advantages. These include better maneuverability and greater stability on side slopes and are especially valuable in relatively tall, bulky machines such as combine harvesters. These advantages depend at least in part, on a form of articulation or hinge arrangement permitting oscillation between the bogies when traversing uneven ground. For the vehicle to be most responsive to irregular surfaces and to minimize internal forces during oscillation, the (fore-and-aft) oscillation axis defined by the hinge arrangement should be close to the ground. This of course tends to magnify the relative lateral displacement between adjacent upper portions of the front and rear bogies which must take place during oscillation. If, as is known in some articulated vehicles, a simple short single link, essentially extending between the respective rear and front walls of the front and rear bogies, constitutes the upper portion of the hinge arrangement then, during oscillation, "foreshortening" of the link will cause inconvenient and possibly unacceptable kneeling or tipping of the bogies, so that the upper portions of the bogies will approach each other. Sufficient nominal clearance must be provided to avoid interference between the bogies but for compactness and efficiency in operation it is desirable to minimize the clearance between the bogies. In an earlier U.S. patent application, Ser. No. 020,863 now U.S. Pat. No. 4,317,326 also assigned to the assignee of the present invention, a compound linkage arrangement was proposed as an improvement over a conventional top link (also disclosed in that application) for minimizing, if not eliminating, the tendency to kneeling between the bogies during oscillation. But this solution is relatively heavy, bulky and complex and requires a number of extra pivots which involves the use of relatively close tolerance, somewhat expensive joints if "chucking" and instability are to be avoided.

SUMMARY OF THE INVENTION

Accordingly, it is an object of the invention to provide in an articulated harvester such as a combine, means to minimize the kneeling affect between bogies during oscillation but using only a minimum number of simple parts, low in manufacturing cost and simple to maintain. It is also an object to provide a hinge arrangement which has characteristics making a greater degree of oscillation tolerable.

In general, increasing vertical separation between the upper and lower portions of a hinge arrangement in an articulated vehicle reduces loading of these portions and of related structure in the bogies of the vehicle. At the same time, if the oscillation axis is associated with the lower portion the arrangement must tolerate relatively greater lateral displacement between the upper portions of the bogies for a given degree of oscillation. According to the invention, a hinge arangement is made up of a lower portion connecting lower portions of the respective front and rear bogies and providing a steering pivot center for pivoting about an upright axis, and means permitting oscillation about a fore-and-aft axis. In an upper portion of the hinge, a simple fore-and-aft link is disposed towards the upper portions of the bogies and is pivotally connected at its opposite ends to the bogies. Preferably, the pivot center of the front bogie connection of the top link is towards the rear of the bogie and vertically aligned with the lower portion steering pivot center.

With the top link located in the upper portions of the bogies, and, especially if it is approximately horizontal, linkage forces are minimized and it is feasible to extend it well rearward, towards a rearward portion of the rear bogie unimpeded by the functional structures of the combine. The distance between front and rear pivots of the top link is preferably not less than approximately equal to the vertical separation of the upper and lower hinge members and may be approximately equal to the length of the wheel base of the vehicle. Certainly, the rear pivot may be rearward of the wheels or adjacent a rear wall of the rear bogie.

For a given lateral displacement, the longer the top link the smaller the angular displacement of the link and hence the smaller the foreshortening effect. Thus the longer the top link the less the clearance which must be provided between the upper portions of the bogies to accommodate the kneeling effect and so the nominal spacing of the bogies can be reduced. Thus a long top link according to the invention, spaced vertically as far as possible above the lower portion of the hinge arrangement, minimizes the kneeling effect while at the same time minimizing forces in the hinge members and related members in the vehicle so that lighter, lower cost members may be used.

DESCRIPTION OF THE PREFERRED EMBODIMENTS

Figure 1:
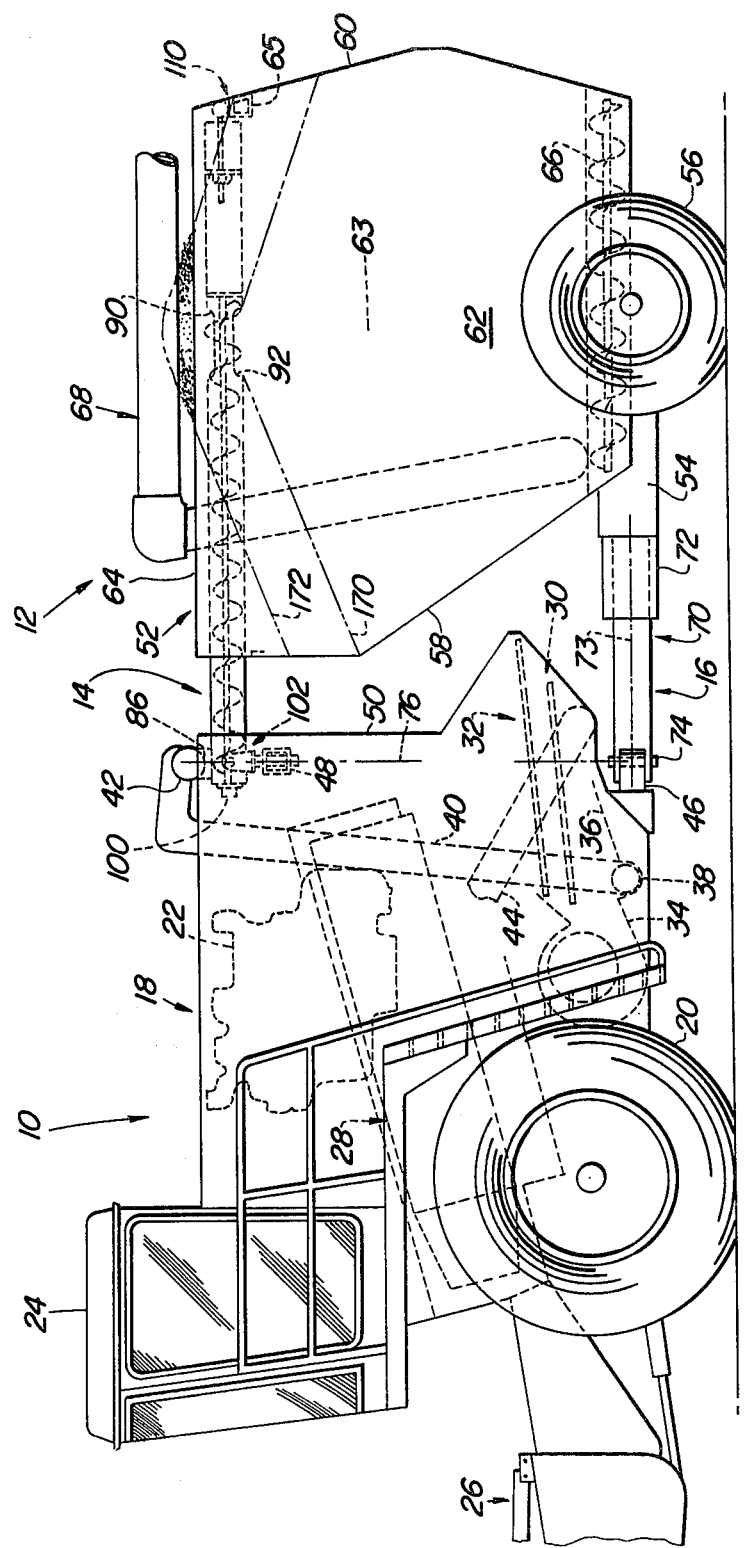
FIG. 1 is a semi-schematic left-hand side elevation of an articulated combine embodying the invention.
Figure 2:
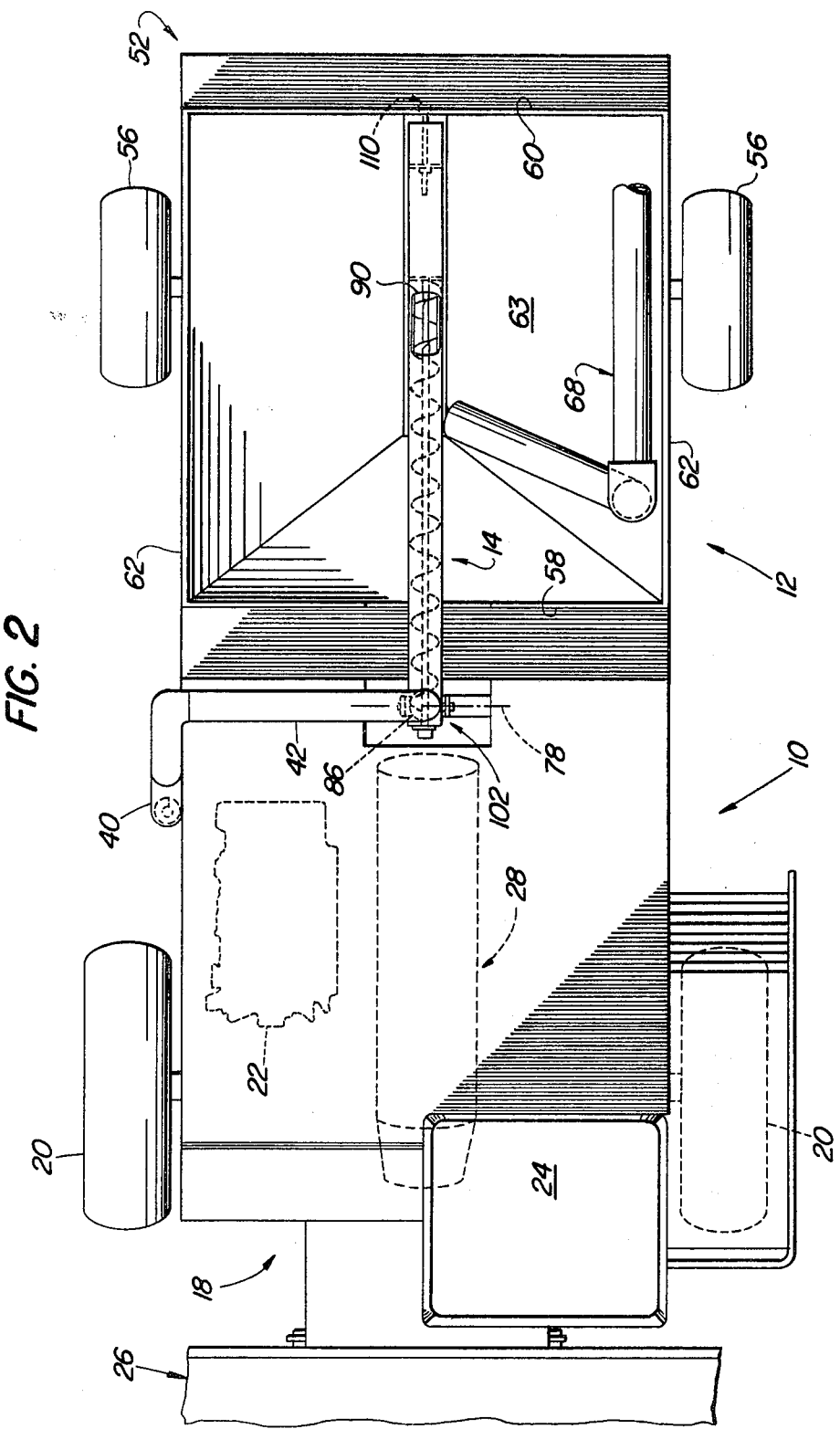
FIG. 2 is an overhead semi-schematic view of the combine.

An exemplary embodiment of the invention is illustrated in the articulated combine of FIGS. 1 and 2. A combine of this general type has been described in some detail in U.S. patent application Ser. No. 020,863 now U.S. Pat. No. 4,317,326 and only a brief description of the general structure and functions of such a machine need be given here.

Front and rear bogies 10 and 12 respectively are connected by a hinge arrangement including upper and lower links 14 and 16, respectively. The main body 18 of the front bogie 10 is supported above the ground on a pair of laterally spaced wheels 20. Power for the entire machine comes from an engine 22 mounted towards the right-hand side of the body 18 and the combine is controlled from an operator's station 24.

As the machine advances over a field, a harvesting header 26 shown partially only in FIG. 1, gathers and delivers crop material to a generally fore-and-aft oriented axial flow rotary separator 28. Separated grain and chaff is delivered to a cleaner 30 in a conventional way and straw is discharged upon the ground (not shown). The header 26, separator 28 and cleaner 30 are all included in the front bogie 10.

The cleaner 30 is generally conventional and includes a pair of sieves 32 "fluidized" by air from a blower 34. A collecting floor 36 diverts cleaned grain to a clean grain cross auger 38 from whence a clean grain elevator 40 carries it upwards to a short transverse auger 42 which delivers it to the upper rear center portion of the front bogie 10. Tailings are returned for rethreshing by tailings return elevator 44 shown partially only in FIG. 1. A drawbar 46, connected rigidly to the body 18 extends rearwardly from a lower central portion of the front bogie 10. The body 18 also includes a transverse rear upper frame member 48 carried adjacent a rear wall 50 of the body 18.

In the rear bogie 12, the body 52 is supported on a chassis or frame 54 in turn supported above the ground by a pair of laterally spaced wheels 56. The front and area walls 58 and 60 respectively and the opposite side walls 62 define a grain tank 63, a large grain receiving and holding receptacle occupying virtually the entire body 52 of the rear bogie, its upper limit being defined by the top 64 of the side walls 62. A transversely extending frame member 65 is carried towards the upper edge of the rear wall 60. Unloading of grain from the tank 64 is conventional, by means of bottom collecting auger 66 and swingable unloading auger assembly 68.

The lower link 16 includes a fore-and-aft extending tongue assembly 70 carried in fixed directional relationship to the chassis 54 of the rear bogie by a swivel arrangement 72 at its rearward end. The swivel permits relative rotation between the tongue assembly 70 and the rear bogie body 52 about a longitudinal or fore-and-aft axis 73. The tongue assembly 70 is coupled or hitched to the draw bar 46 of the front bogie 10 by a hitch pin 74, the coupling permitting pivoting between front and rear bogies about an upright axis 76 and containing enough play or looseness to permit limited relative pivoting about a transverse axis 78 through the coupling.

Figure 3:
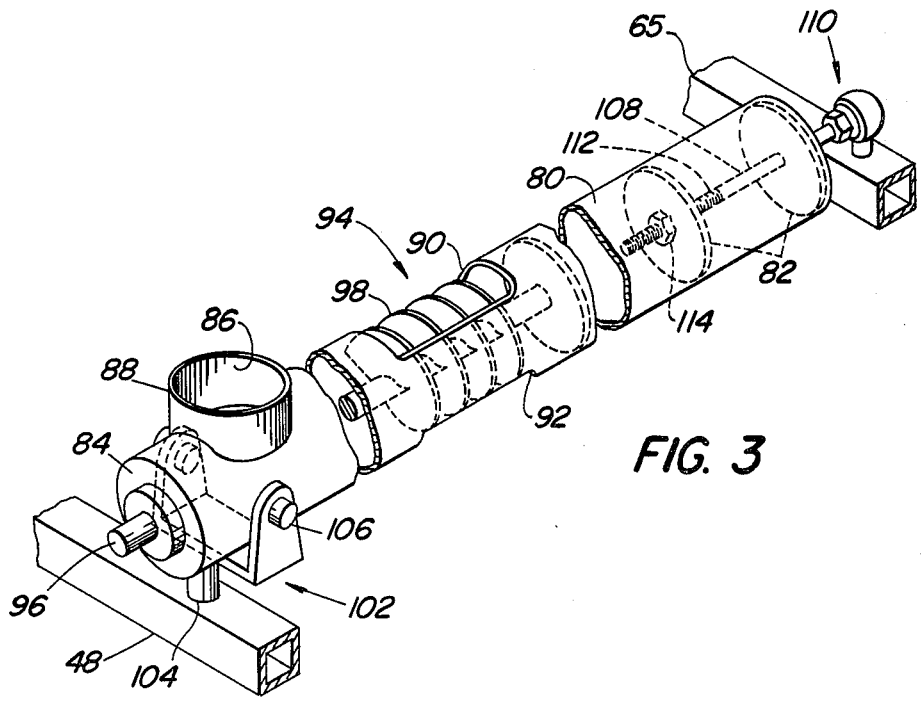
FIG. 3 is an enlarged partial left-hand front three-quarter perspective view of the dual purpose member serving as both an upper connecting link between the bogies of the combine and also as a conveyor for transferring clean grain between them.

Turning now to the upper connecting link 14 and referring particularly to FIG. 3, we note that structurally it consists principally of an elongated tube 80 which also serves as an auger housing. The rearward end of the tube is closed by a pair of spaced bulkheads 82 and at the front by a bulkhead or cap 84. At the forward end of the tube 80, an upwardly facing inlet 86 is bounded by a generally cylindrical wall 88. Disposed towards the rear of the tube 80 and so as to be approximately over the center of the tank 64 are a pair of vertically opposite upper and lower discharge openings 90 and 92 respectively. The tube 80 houses an auger assembly 94, rotatably supported in the tube by auger shaft 96 and including auger flighting 98 extending from the upstream end adjacent the inlet 86 to just beyond the outlets 90, 92. A hydraulic motor 100 (FIG. 1) drives the auger through the forward end of the shaft 96.

The pivot center of the coupling of the upper link 14 to the front bogie 10 is defined by a trunion assembly 102 pivoting about a vertical axis on pin 104 carried in the upper frame member 48 vertically above the hitch pin 74. The auger tube 80 is carried on opposite transversely mounted co-axial pins 106. This trunion coupling provides for relative pivoting between the bogies on upright and transverse axes. The coupling of the rear end of the auger tube 80 to the rear bogie 12 includes a support shaft 108 carried by the bulkheads 82 coxially with the auger tube 80 and modified at its rearward end to become part of a ball and socket assembly 110 carried by the rear bogie upper frame member 65. A threaded portion 112 of the shaft 108 and nuts 114 provide for adjustment of the overall length of upper connecting link 14. Collectively, the coupling of front and rear bogies just described provides for universal relative pivoting movement between them including oscillation about the fore-and-aft axis 73 as well as pivoting on the upright steering axis 76 and the transverse axis 78 passing through the hitch (drawbar 46, hitch pin 74), which may also be regarded as a steering pivot center.

Figure 5:
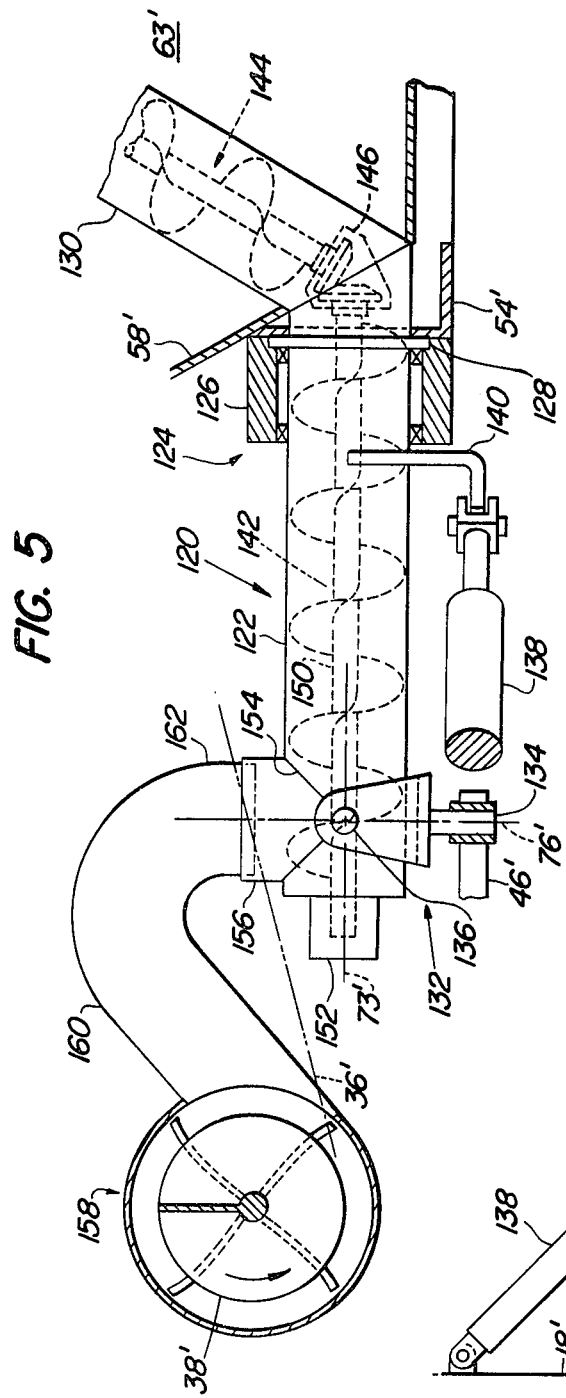
FIG. 5 is an enlarged partial semi-schematic side view of an alternative embodiment in which the lower connecting link between the bogies of the combine serves also as a conveyor.
Figure 7:
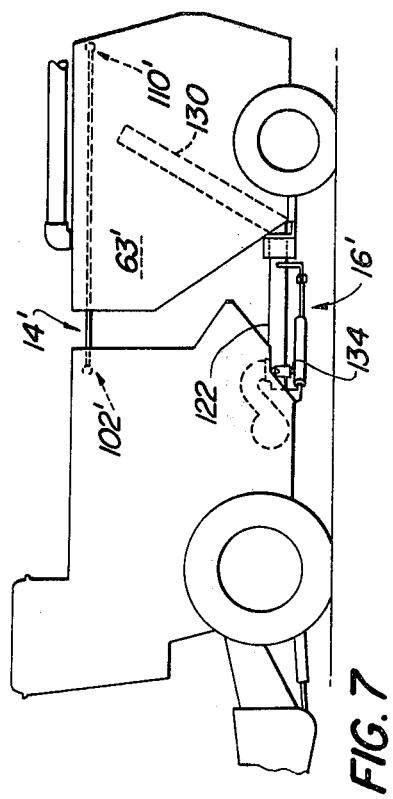
FIG. 7 is a reduced and simplified side view of a combine with the embodiment of FIG. 5.

In an alternative embodiment of the invention, the general configuration of the combine remains the same, as indicated in FIG. 7. Now, however, the upper link 14' is in the form of a simple structural member and, as best seen in FIG. 5, a lower link 16', connecting the bogies, also serves as a conveyor. A tongue assembly 120 includes a fore-and-aft extending tube or housing 122 rotatably mounted in a swivel assembly 124 which includes a swivel housing or casing 126 rigidly carried by the frame 54' of the rear bogie. A thrust flange 128 retains the tube 122 in the swivel assembly 124. An inclined tube 130 extends rearwardly and upwardly into the grain tank 63'0 communicating with and forming an extension of the horizontal tube portion 122.

A trunion assembly 132 couples the tube 122 and hence the rear bogie to the front bogie at draw bar 46'. Vertical and horizontal pins 134 and 136, respectively provide for relative pivoting about upright and transverse axis 76', 78' while the swivel assemblfy 124 permits oscillation between front and rear bogies about a fore-and-aft axis 73'.

Figure 6:
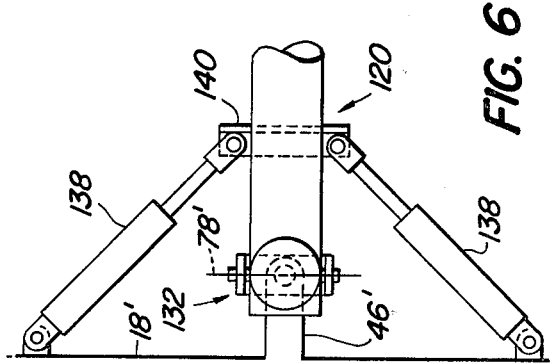
FIG. 6 is an overhead partial view of the steering arrangement of the embodiment of FIG. 5.

A pair of hydraulic cylinders 138, seen best in FIG. 6, connected between the frame or body of the front bogie 18' and a bracket 140 rigidly attached to and extending downwards from the tube 122, serve as steering actuators. A conventional hydraulic system (not shown) provides necessary hydraulic power and controls. A similar steering arrangement may be used in the embodiment of FIGS. 1 and 2 but is not shown in those figures. Preferably the mechanical connections of the cylinders are ball jointed to accommodate changes in their alignment as the bogies oscillate and kneel.

The alternative lower conveyor link assembly (FIG. 5) is completed by coupled horizontal and inclined screw conveyor assemblies, 142 and 144 respectively, drivingly connected by an enclosed bevel gear case 146. A central shaft 150 of the horizontal auger assembly 142 extends forward from the tube 122 to be coupled with and driven by a hydraulic motor 152. A generally circular upwardly facing opening 154 in the tube 122, bounded by a generaly cylindrical wall 156, forms an inlet for material from the conveyor link. This inlet is vertically aligned with or coaxial with the steering or upright pivot axis 76' defined by the pin 134 of the trunion assembly 132. It therefore provides an essentially stationary receiving inlet for grain transferred from the cleaner by an impeller 158 coaxial with the clean grain auger 38' by way of deflector chute 160 which has a generally circular outlet 162 aligned with the inlet 154.

In operation, the gathering, feeding, threshing and separating of crop material and the delivery of grain and chaff mixture from the separator to the cleaner 30 is all conventional. Also in the embodiment shown in FIGS. 1, 2 and 3, the transfer of clean grain from the cleaner to the discharge from the upper transverse auger 42 is also generally conventional, the discharge from the upper cross auger 42 corresponding to delivery of clean grain to a grain tank in a conventional fixed chassis combine. However, in this case, the discharge is into the inlet 86 of the top link assembly 14 and engagement by the transfer auger assembly 94 for conveying or transfer across the hinge area of the combine to the rear bogie and discharge into the grain tank 63.

The operation of the embodiment shown in FIGS. 5 and 7 is also generally conventional up to the delivery of clean grain to the clean grain cross auger 38'. The auger 38' delivers clean grain to the impeller 158 rather than as is conventional to an upright clean grain elevator. The chute 160 deflects grain discharged by the impeller 158 down into the inlet 154 of the lower link transfer conveyor assembly. Then the conveyor augers 142, 144 carry the cleaned grain into the grain tank 63'. Discharge from the inclined portion of the screw conveyor (130, 144) is in the well-known fountain mode in approximately the center of the tank as indicated in FIG. 7.

Figure 4:
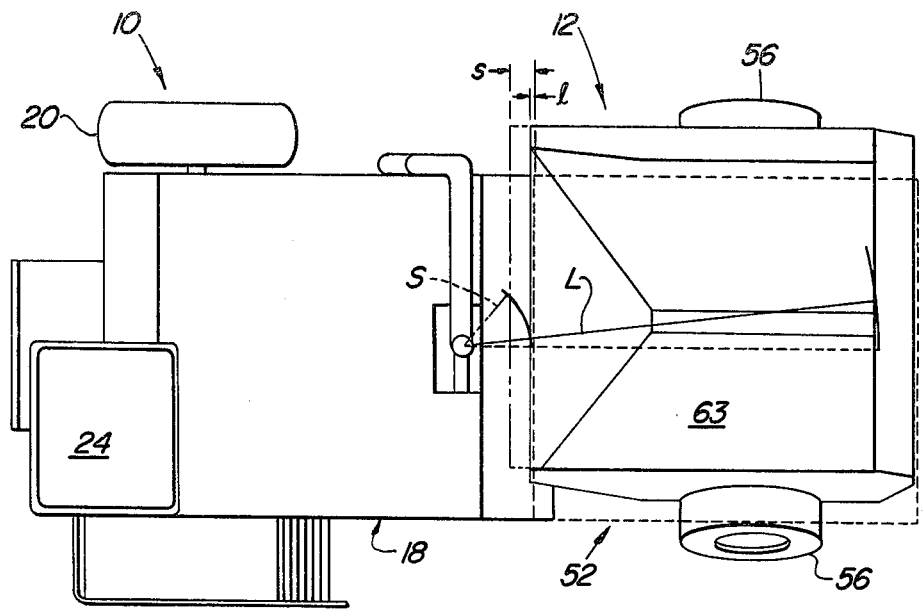
FIG. 4 is a simplified and reduced overhead schematic view of the combine comparing the "kneeling" effect of longer and shorter upper connecting links.

As the combine traverses uneven ground, there is oscillation between the front and rear bogies with relative lateral displacement between upper portions of the bogies as indicated in FIG. 4 which compares the foreshortening and kneeling effect of short and long upper links S and L respectively for similar lateral displacement of the rear bogie relative to the front. The angular displacement of the short link S is relatively high and the effective foreshortening S is much greater than the corresponding 1 for the long link L according to the invention. Therefore, the nominal level-ground fore-and-aft clearances between the bogies can, with a top link according to the invention, be substantially less than with any conventional short link and even so, sufficient clearance will be maintained even at the maximum required or desired oscillation. The smaller nominal clearances between bogies made feasible by the long top link make it desirable to provide length adjustment (threaded shaft portion 112 and nuts 114) so that the nominal or level ground clearance between the bogies can be adjusted to correct, for example, for manufacturing variations. In the embodiments shown, the advantages of the invention are maximized by setting the spacing of the hinge arrangement pivot center at about the maximum the dimensions of the combine will permit. Thus, as can be seen in FIG. 1 (and similarly in FIG. 7) the fore-and-aft spacing of the top link pivot centers (trunion 102, 102' and ball and socket 110, 110') is greater than the vertical spacing of the steering axis pivots (hitch pin 74, 74' and trunion 102, 102').

Spacing the upper and lower link members of the hitch arrangement of the bogies at substantially the full vertical height of the vehicle and having the lower link provide the oscillation axis (73, 73') has several advantages. The oscillation axis is close to the ground so that effective leverage is low and internal forces set up in the vehicle due to relative lateral displacement of the wheels during oscillation are minimized. Hinge forces in general are lower because of the lower leverage effect resulting from the wide spacing of the components of the linkage. The upper link is away from interference with other components of the machine and it becomes feasible to extend it to a rear connecting or pivot point towards the rear of the rear bogie. Space is available for swinging of the top link relative to the upper portions of the rear bogie without interfering with any functions of the rear bogie.

Maximum vertical spacing of the hinge components results not only in reduced linkage forces but also, if the lower link provides the oscillation axis, in a magnified lateral displacement effect at the upper portions of the bogies. Use of a long top link according to the invention makes a given amount of oscillation more tolerable or makes increased oscillation more feasible because of the relatively small kneeling effect of the long top link. When the front pivot of the top link is vertically aligned with the lower link pivot (steering pivot center), the steering axis (76, 76') is upright and there is no leaning of the bogies due to steering.

The advantages accruing from the long top link are obtained with a minimum number of simple parts especially if the top link is substantially horizontal and comprises a simple fore-and-aft link with simple pivot connections at its opposite ends to the respective front and rear bogies. Connecting the long top link between the respective rearward portions of the bogies leaves the front bogie entirely free for the principal functional components of the combine and so that access to them is unimpeded. Extending the top link rearward to at least beyond the axle of the rear bogie and possibly to the rear wall as in the present embodiment, achieves the advantages of the invention without encroaching on zones of the vehicle required for other functions.

I claim:

1. An articulated harvester having front and rear bogies each having a body of substantial vertical extent and each having axles carrying a pair of laterally spaced wheels, said bogies being connected by a hinge arrangement having spaced apart upper and lower portions and permitting pivoting between the bodies about upright steering and fore-and-aft oscillation axes, said upper portion comprising an elongated link pivotally connected at its opposite ends to the respective front and rear bogies characterized in that:

the pivot center of the connection of the upper link to the rear bogie is disposed substantially rearward of the axle of that bogie.

2. The harvester of claim 1 further characterized in that the pivot centers of both connections of the upper link are disposed adjacent the rear of the bodies of the respective front and rear bogies.

3. The harvester of claim 1 further characterized in that the upper link is substantially horizontal and disposed adjacent the uppermost portions of the respective bodies of the front and rear bogies.

4. The harvester of claim 1 further characterized in that the fore-and-aft spacing of the pivot centers of the upper link is approximately equal to the wheel base of the combine.

5. The harvester of claim 1 further characterized in that the fore-and-aft spacing of the pivot centers of the upper link is greater than approximately half the length of the wheel base of the combine.

6. The harvester of claim 1 further characterized in that the pivot center of the upper link connection to the front bogie lies approximately on the steering axis of the combine.

7. The harvester of claim 1 further characterized in that the upper and lower portions of the hinge arrangement are widely spaced and that the lower portion permits the pivoting about a fore-and-aft oscillation of axis.

8. The harvester of claim 7 further characterized in that the respective upper and lower portions of the hinge arrangement are disposed adjacent the respective uppermost and lowermost portions of the respective bodies of front and rear bogies so that the oscillation axis passes through the lower portions of the bodies.

9. The harvester of claim 7 further characterized in that the fore-and-aft spacing of the pivot centers of the upper link is greater than approximately the spacing between the upper and lower portions of the hinge arrangement.

10. An articulated combine harvester comprising:

a front bogie having means for harvesting a crop from a field as the harvester advances, a body supported above the ground on a pair of laterally spaced wheels and housing crop processing means and having a rear wall;

a rear bogie supported above the ground on a pair of laterally spaced wheels and including a body having a rear wall and including grain holding means;

a hinge arrangement having spaced apart upper and lower portions and permitting pivoting between the bodies about upright steering and fore-and-aft oscillation axes, said upper portion comprising an elongated link pivotally connected at its opposite ends adjacent the respective rear walls of bodies of the respective front and rear bogies; and means for transferring at least a portion of the harvested crop material from the front bogie to the rear bogie.

11. The combine harvester of claim 10 wherein the connections of the elongated link are disposed in the uppermost portions of the bodies of the respective bogies.

12. The combine harvester of claim 10 wherein the oscillation axis is defined at least in part by the lower portion of the hinge arrangement.

13. The combine harvester of claim 10 wherein the connection of the elongated link of the upper portion of the hinge arrangement defines a pivot center and said pivot center lies approximately on the steering axis of the combine.

* * * * *